United States Patent [19]

Boice et al.

[11] Patent Number: 5,644,504

[45] Date of Patent: Jul. 1, 1997

[54] DYNAMICALLY PARTITIONABLE DIGITAL VIDEO ENCODER PROCESSOR

[75] Inventors: Charles Edward Boice; John Mark Kaczmarczyk, both of Endicott; Agnes Yee Ngai, Endwell; Robert Leslie Woodard, Newark Valley, all of N.Y.

[73] Assignee: International Business Machines Corporation, Armonk, N.Y.

[21] Appl. No.: 411,239

[22] Filed: Mar. 27, 1995

[51] Int. Cl.$^6$ ................................................ G06K 15/00
[52] U.S. Cl. .................. 364/514 A; 348/401; 348/409; 348/397; 364/725.01; 382/248; 382/250
[58] Field of Search ............................ 364/514 A, 725; 348/413, 403, 419, 384, 409, 422, 394, 405, 397, 467, 426, 465, 400, 401, 398; 382/166, 234, 248, 250

[56] References Cited

U.S. PATENT DOCUMENTS

| | | | |
|---|---|---|---|
| 4,851,906 | 7/1989 | Koga et al. | 348/413 |
| 5,038,390 | 8/1991 | Chandran | 382/248 |
| 5,179,442 | 1/1993 | Azadegan et al. | 348/403 |
| 5,196,933 | 3/1993 | Henot | 348/419 |
| 5,198,901 | 3/1993 | Lynch | 348/413 |
| 5,212,742 | 5/1993 | Normile et al. | 382/166 |
| 5,253,056 | 10/1993 | Puri et al. | 348/384 |
| 5,260,782 | 11/1993 | Hui | 348/409 |
| 5,272,529 | 12/1993 | Frederiksen | 348/422 |
| 5,285,276 | 2/1994 | Citta | 348/409 |
| 5,327,509 | 7/1994 | Rich | 382/108 |
| 5,333,118 | 7/1994 | Rossmere et al. | 364/725 |
| 5,347,308 | 9/1994 | Wai | 348/394 |
| 5,347,310 | 9/1994 | Yamada et al. | 348/405 |
| 5,392,073 | 2/1995 | Jeong | 348/405 |
| 5,394,349 | 2/1995 | Eddy | 364/725 |
| 5,426,462 | 6/1995 | Bui | 348/401 |
| 5,526,054 | 6/1996 | Greenfield et al. | 348/467 |

OTHER PUBLICATIONS

MPEG; A Video Compression Standard for Multimedia Applications; Gall; Apr. 1991, vol. 34, No. 4 Communications of the ACM.

Encoding of motion video sequences for the MPEG environment using arithmetic coding; Viscito, Gonzales; SPIE vol. 1360 Visual Communications and Image Processing '90.

The MPEG video compression algorithm; Le Gall; Elsevier Science Publishers B.V. vol. 4, No. 2 Apr., 1992.

C-Cube MPEG Video Processor; Purcell, Galbi; SPIE; vol. 1659, 1992, pp. 24–29.

Motion Video Adaptive Quantization In the Transfor; Gonzales, Viscito; IEEE Trans Circuits System Video Technology, vol. 1, Dec. 4, 1991; pp. 374–378.

*Primary Examiner*—Wellington Chin
*Assistant Examiner*—Melissa Kay Carman
*Attorney, Agent, or Firm*—Richard M. Goldman

[57] ABSTRACT

Disclosed is a digital video encoder processor for discrete cosine transform encoding. The discrete cosine transform encoding includes the encoding steps of (1) determining the discrete cosine transform field or frame type, (2) addressing individual pixels as either (i) vertically adjacent pixels on consecutive Odd and Even field lines, or (ii) vertically adjacent pixels on consecutive Odd field lines, then consecutive Even field lines; or (iii) vertically adjacent pixels on consecutive Even field lines, then consecutive Odd field lines. These subtractions may be performed between (i) consecutive lines, (ii) odd lines, or (iii) even lines. The next step is finding the smallest variance of the above subtractions to determine the discrete cosine transform coding type. The subtractions are carried out in a dynamically partitionable processor having a plurality of datapaths. The datapaths are partitionable by the action of running opcode into (i) a single wide datapath, and (ii) a plurality of narrow datapaths for calculating the absolute value of the difference between two pixels, and accumulating the results of the subtraction.

7 Claims, 4 Drawing Sheets

DYNAMICALLY PARTITIONABLE DIGITAL VIDEO ENCODER PROCESSOR

FIELD OF THE INVENTION

This invention relates to video encoders, especially video encoders intended to encode and further compress video signals, e.g., discrete cosine transform encoded video signals. The invention relates especially to dynamically partitionable digital video processors for digital video signal encoding. A dynamically partitionable digital video processor, as used herein, means a processor that can function as an n unit processor, e.g., a four byte wide processor, and as n 1-unit processors, e.g., as four one-byte wide processors. The method, apparatus, and system of the invention are useful compressing video signals, as in encoding broadcast signals, cablecast signals, and digital network signals, as well as in high definition television, interactive television, multimedia, video on demand, video conferencing, and digital video recording.

BACKGROUND OF THE INVENTION

The Moving Picture Experts' Group (MPEG) MPEG-2 Draft Standard is a compression/decompression standard for digital video applications. The standard describes an encoding method that results in substantial bandwidth reduction by a subjective lossy compression followed by a lossless compression. The encoded, compressed digital video data is subsequently decompressed and decoded in an MPEG-2 Draft Standard compliant decoder.

The MPEG-2 Draft Standard is described in, e.g., C. A. Gonzales and E. Viscito, "Motion Video Adaptive Quantization In The Transform Domain," *IEEE Trans Circuits Syst Video Technol*, Volume 1, No. 4, December 1991, pp. 374–378, E. Viscito and C. A. Gonzales, "Encoding of Motion Video Sequences for the MPEG Environment Using Arithmetic Coding," *SPIE*, Vol. 1360, pp. 1572–1576, (1990), D. LeGall, "MPEG: A Video Compression Standard for Multimedia Applications," *Communications of the ACM*, Vol. 34, No. 4, (April 1991), pp. 46–58, S. Purcell and D. Galbi, "C Cube MPEG Video Processor," *SPIE*, v. 1659, (1992) pp. 24–29, and D. J. LeGall, "MPEG Video Compression Algorithm," *Signal Process Image Commun*, v. 4, n. 2, (1992), pp. 129–140, among others.

The MPEG-2 Draft Standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 Draft Standard result in a balance between intraframe encoding alone and interframe encoding alone.

The MPEG-2 Draft Standard exploits temporal redundancy for motion compensated interpolative and predictive encoding. That is, the assumption is made that "locally" the current picture can be modelled as a translation of the picture at a previous and/or future time. "Locally" means that the amplitude and direction of the displacement are not the same everywhere in the picture.

MPEG-2 Draft Standard specifies predictive and interpolative interframe encoding and frequency domain intraframe encoding. It has block based motion compensation for the reduction of temporal redundancy, and Discrete Cosine Transform based compression for the reduction of spatial redundancy. Under MPEG-2 Draft Standard motion compensation is achieved by predictive coding, interpolative coding, and Variable Length Coded motion vectors. The information relative to motion is based on 16×16 blocks and is transmitted with the spatial information. It is compressed with Variable Length Codes, such as Huffman codes.

The MPEG-2 Draft Standard provides temporal redundancy reduction through the use of various predictive and interpolative tools. This is illustrated in FIG. 1. FIG. 1 shows three types of frames or pictures, "I" Intrapictures, "P" Predicted Pictures, and "B" Bidirectional Interpolated Pictures.

The "I" Intrapictures provide moderate compression, and are access points for random access, e.g., in the case of video tapes or CD ROMS. As a matter of convenience, one "I" Intrapicture is provided approximately every half second. The "I" Intrapicture only gets information from itself. It does not receive information from any "P" Predicted Pictures or "B" Bidirectional Interpolated Pictures. Scene cuts preferably occur at "I" Intrapictures.

"P" Predicted Pictures are coded with respect to a previous picture. "P" Predicted Pictures are used as the reference for future pictures, both "P" and "B" pictures.

"B" Bidirectional Coded pictures have the highest degree of compression. They require both a past picture and a future picture for reconstruction. "B" bidirectional pictures are never used as a reference.

Motion compensation goes to the redundancy between pictures. The formation of "P" Predicted Pictures from "I" Intrapictures and of "B" Bidirectional Coded Pictures from a pair of past and future pictures is a key feature of the MPEG-2 Draft Standard technique.

The motion compensation unit under the MPEG-2 Draft Standard is the Macroblock unit. The MPEG-2 Draft Standard Macroblocks are 16×16 pixel macroblocks. Motion information consists of one vector for forward predicted macroblocks, one vector for backward predicted macroblocks, and two vectors for bidirectionally predicted macroblocks. The motion information associated with each 16×16 macroblock is coded differentially with respect to the motion information present in the reference macroblock. In this way a 16×16 macroblock of pixels is predicted by a translation of a 16×16 macroblock of pixels from a past or future picture.

The difference between the source pixels and the predicted pixels is included in the corresponding bit stream. The decoder adds the correction term to the block of predicted pixels to produce the reconstructed block.

As described above and illustrated in FIG. 1, each 16×16 pixel block of a "P" Predicted Picture can be coded with respect to the closest previous "I" Intrapicture, or with respect to the closest previous "P" Predicted Picture.

Further, as described above and illustrated in FIG. 1, each 16×16 pixel block of a "B" Bidirectional Picture can be coded by forward prediction from the closest past "I" or "P" Picture, by backward prediction from the closest future "I" or "P" Picture, or bidirectionally, using both the closest past "I" or "P" picture and the closest "future "I" or "P" picture. Full bidirectional prediction is the least noisy prediction.

Motion information is sent with each 16×16 pixel block to show what part of the reference picture is to be used as a predictor.

As noted above, motion vectors are coded differentially with respect to motion vectors of the previous adjacent block. Variable Length Coding is used to code the differential motion vector so that only a small number of bits are needed to code the motion vector in the common case, where the motion vector for a block is nearly equal to the motion vector for a preceding block.

Spatial redundancy is the redundancy within a picture. Because of the block based nature of the motion compensation process, described above, it was desirable for the MPEG-2 Draft Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After transformation, many of the frequency coefficients are zero, especially the coefficients for high spatial frequencies. These coefficients are organized into a zig-zag, as shown in FIG. 2, and converted into run-amplitude (run-level) pairs. Each pair indicates the number of zero coefficients and the amplitude of the non-zero coefficient. This is coded in a Variable Length Code.

Discrete Cosine Transformation encoding is carried out in the three stages as shown in FIG. 2. The first stage is the computation of the Discrete Cosine Transformation coefficients. The second step is the quantization of the coefficients. The third step is the conversion of the quantized transform coefficients into {run-amplitude} pairs after reorganization of the data into zig-zag scanning order.

Quantization enables very high degrees of compression, and a high output bit rate, and retains high picture quality.

Quantization can be adaptive, with "I" Intrapictures having fine quantization to avoid "blocking." This is important because "I" Intrapictures contain energy at all frequencies. By way of contrast, "P" and "B" pictures contain predominantly high frequency energy and can be coded at a coarser quantization.

The MPEG-2 Draft Standard specifies a layered structure of syntax and bit stream. The bit stream is separated into logically distinct entities to prevent ambiguities and facilitate decoding. The six layers are shown in Table 1, below

TABLE 1

MPEG-2 Draft Standard Layers

| Layer | Purpose |
| --- | --- |
| Sequence Layer | Random Access Unit and Context |
| Group of Pictures Layer | Random Access Unit and Video Coding |
| Picture Layer | Primary Coding Unit |
| Slice Layer | Resynchronization Unit |
| Macroblock Layer | Motion Compensation Unit |
| Block Layer | DCT Unit |

Encoding can be accomplished by hardware or by software. Hardware encoding is generally faster than software encoding. However, even hardware encoding is slow, given the bit rate of a video image and the narrow bandwidth of the transmission medium. One reason for this is the many steps required in forming the Discrete Cosine Transform, and calculating all of its coefficients.

OBJECTS OF THE INVENTION

It is one object of the invention to provide a system that increases the speed of the encoding process, especially the Discrete Cosine Transform encoding process.

It is still another object of the invention to reduce the clock cycles required for encoding a picture.

SUMMARY OF THE INVENTION

These and other objects of the invention are attained by the digital signal encoder system of the invention. The system is useful for receiving the pre-processed, partially encoded but uncompressed macroblock and forming the discrete cosine transform thereof. The processor of the invention works in conjunction with other elements of the encoder system including a quantizer, a variable length code encoder, and a FIFO data output buffer to provide an integrated system.

The processor of the invention is utilized in a digital video encoder processor for discrete cosine transform encoding. The discrete cosine transform encoding includes the encoding steps of (1) determining the discrete cosine transform field or frame type, (2) addressing individual pixels as either (i) vertically adjacent pixels on consecutive Odd and Even field lines, or (ii) vertically adjacent pixels on consecutive Odd field lines, then consecutive Even field lines; or (iii) vertically adjacent pixels on consecutive Even field lines, then consecutive Odd field lines. These subtractions may be performed between (i) consecutive lines, (ii) odd lines, or (iii) even lines. The next step is finding the smallest variance of the above subtractions to determine the discrete cosine transform coding type. The subtractions are carried out in a dynamically partitionable processor having a plurality of datapaths. The datapaths are partitionable by the action of running opcode into (i) a single wide datapath, and (ii) a plurality of narrow datapaths for calculating the absolute value of the difference between two pixels, and accumulating the results of the subtraction.

THE FIGURES

DETAILED DESCRIPTION OF THE INVENTION

Figure 1:
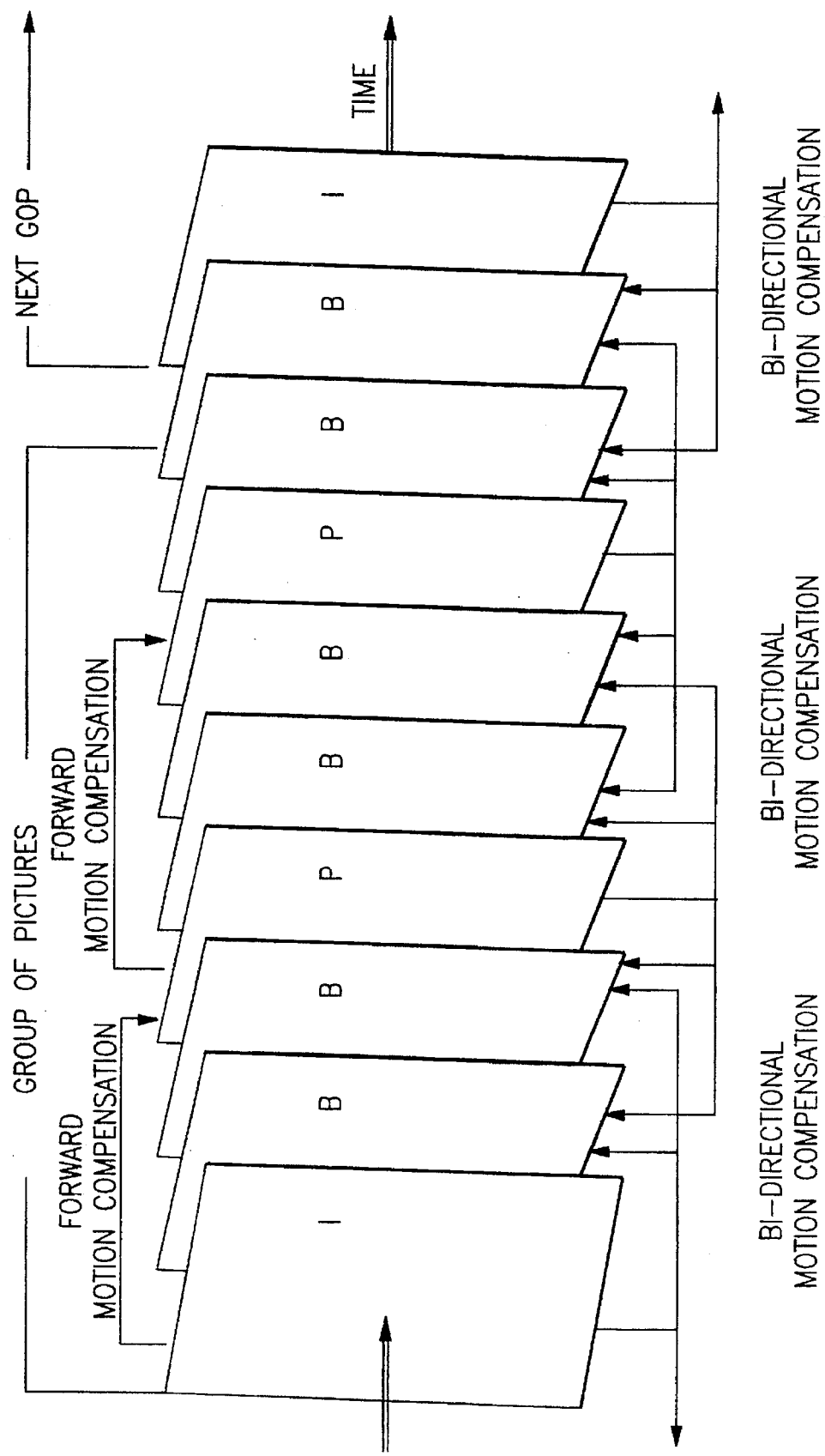
FIG. 1 shows the relationship of the Intraframe, the Predicted Frames, and the Bidirectional Frames to form a Group of Pictures.
Figure 2:
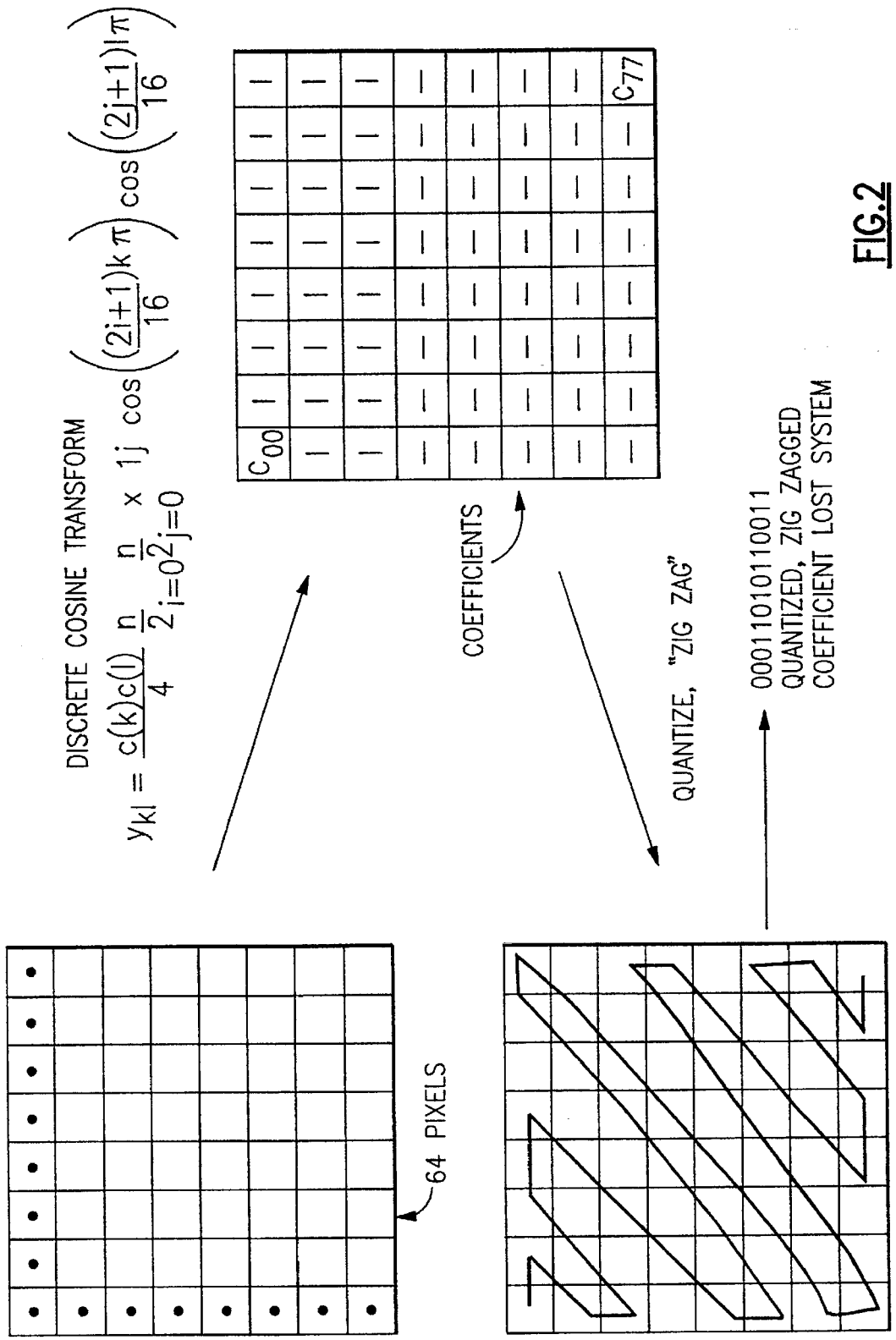
FIG. 2 is a flow chart of three stages of discrete cosine transform encoding.

Every pixel in a digital video picture is represented by 1 byte of luminance and 1 byte of chrominance information. This is specified in the 4:2:2 MPEG standard. With a maximum picture size of 720 by 480 pixels and a transmission rate of 30 pictures per second, storage of the video image requires a large amount of memory. Moreover, a high bandwidth is required to transmit a video image across a transmission medium. Digital video compression is introduced to lower the memory and transmission medium bandwidth requirements. The end result of compression is a digital video image with less data bytes than the original picture but with as much information as possible.

One step in video compression is to determine the quantization value per segment of the picture. The concept of quantization is to reduce the value of each pixel in the segment by a stepsize so that as many zeros as possible are created. In general, as the result of subsequent compression and encoding techniques, zeros require less data bits to represent. The value of the quantization factor or constant is selected based upon a human vision model. The selection of the quantization value requires computation that involves every pixel in the segment. There are 256 bytes of luminance data per macroblock in the 4:2:2 MPEG standard. To involve every pixel would require 256 operations. To speed up the computation, the operations are carried out in parallel.

The processor 11 of the invention has an instruction store 21 where microcode is stored. The processor 11 has a four byte wide arithmetic and logical unit 31 that is comprised of four one byte ALU's, 33, 35, 37, and 39. The processor 11 has a two level set of general purpose working registers, 41, a group of special purpose registers, 43, an instruction address stack, and a condition register, 45.

The processor 31 can perform four byte wide arithmetic and logical operations in the pipelines ALU 31. The pipelined ALU, 31, is made up of four individual one byte ALUs, 33, 35, 37, and 39. These four specialized arithmetic and logical units, ALUs, 33, 35, 37, and 39, are the core of the arithmetic and logic operations. Processor operations occur in four pipelined cycles:

1. FETCH,
2. DECODE,
3. EXECUTE, and
4. WRITE BACK.

Microcode instructions are first fetched from the instruction store, 21, and then decoded. The ALU controller, 30, provides data/control signals from the register/memory interface unit, 47, and the instruction fetch/decode unit, 23, respectively, through the ALU control unit, 30, to the ALUs, 33, 35, 37, and 39, based on the decoded instruction and the results of the previous instructions for data pipelining.

The processor, 11, can operate on either register/memory data from the register/memory interface unit, 47, or pixel data sent to the processor, 11, on dedicated pixel buses, 49. Branch/loop instructions are performed by a separate branch/loop processor unit, 25.

Figure 3:
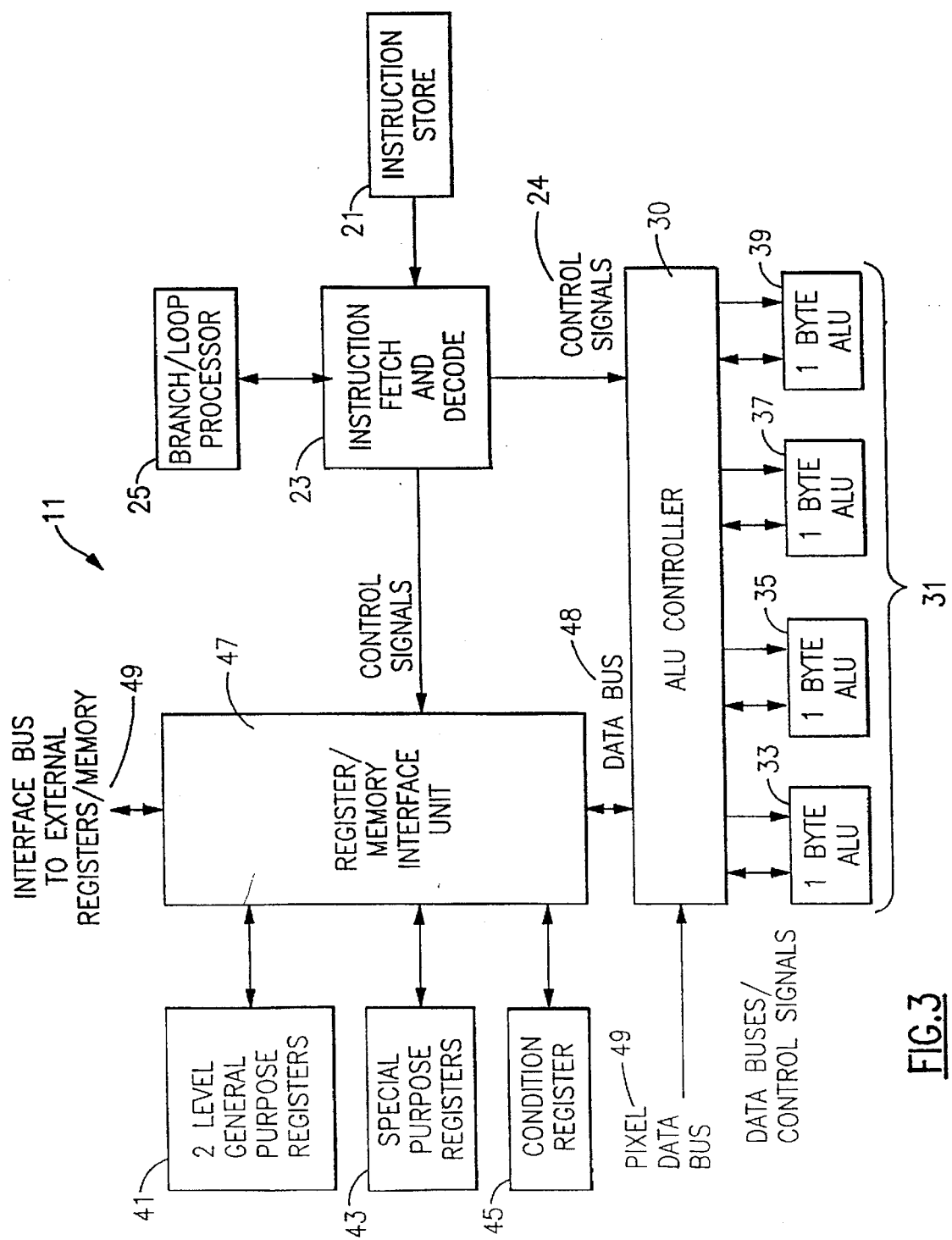
FIG. 3 is a block diagram of the dynamically partitionable digital video encoder processor of the invention.

Data is processed by the ALUs, 33, 35, 37, and 39, in the EXECUTE cycle and stored to registers/memory, 41, 43, and 45, during the WRITE BACK cycle through the register/memory interface unit, 47. The processor, 11, can access a two level set of general purpose working registers, 41, and a group of special purpose registers, 43, internal to the processor, 11. An interface bus, 49, is also provided access to the registers/memory from external sources. A block diagram of the processor, 11, is shown in FIG. 3.

Each instruction is 27 bits wide. There are several instruction formats defined for this processor. A typical instruction has an opcode, a mode bit, destination field, and 2 source fields. The opcode is used to indicate what function is to be performed by the processor.

The mode bit tells the processor how to operate on the instruction. The two modes are "UNI" and "LP". "UNI" mode operates as one four byte operation. While "LP" mode (LOGICAL PARTITION) operates as four one byte operations independent of each other. The source fields specify the location of the inputs to the operations. The destination field specifies the location to store the result of the operations.

The arithmetic and logical function unit, 31, consists of four 1 byte standalone arithmetic and logical units (ALUs), 33, 35, 37, and 39. The carry out of the high order bit of each unit propagates to the next higher order unit if the instruction specifies a 4 byte operation.

In each arithmetic and logical unit, there is an accumulation function. The accumulator per ALU is 16 bits wide. An add accumulate instruction is architected that permits the accumulation of the addition results with the previous data in the accumulator. The add circuitry allows two 8 bit inputs to be added to a 16 bit accumulator. This function permits accumulation of up to 256 bits of input data.

There are eight 8 by 8 multipliers installed in the processor, two per ALU. A 32 by 32 multiplication operation is also architected into the processor.

A subset of the 32 by 32 multiplication is the 32 by 16 multiplication. Two 8 by 8 multipliers in each unit are joined to form an 8 by 16 multiplier. In addition the two 8 by 16 multipliers of adjacent units are joined to form a single 16 by 16 multiplier. The input operands are parsed to allow H×L and L×L multiplications. The result of the two 16 by 16 multiplications are combined to form the 32 by 16 multiplication. This design allows the maximum reuse of circuitry.

One compression technique employed in MPEG2 is Discrete Cosine Transform (DCT) coding. This process is used to convert spatial domain image data into frequency domain image data. The picture image is fed to the DCT process in small subset of 8 by 8 pixels. An 8×8 block of pixels is defined as a macroblock.

If consecutive lines of pixels are used to feed the DCT process, this technique is defined as frame DCT type. Alternatively, if every other line of pixel image data is concatenated to form the 8 by 8 DCT input then this technique is defined as field DCT type. In general if there is motion between the two fields of a picture, as often occurs in interlaced pictures, then the pixel data has large differences between consecutive lines. If there is no motion between fields then there is very little variance between consecutive lines of pixel data. Typically the lower the pixel variance the higher the compression efficiency that can be achieved.

The encoder determines the DCT type, e.g. field or frame, by calculating the variances of the input pixel image. The input is fetched according to the address modes set by the set addressing mode instruction. This instruction sets one of the 6 unique address modes. 'Mode 1' will address two vertically adjacent pixels on consecutive Odd and Even field lines in the macroblock. 'Mode 2' will first address two vertically adjacent pixels on consecutive Odd field lines, then switch to consecutive Even field lines. 'Mode 3' will first address two vertically adjacent pixels on consecutive Even field lines, then switch to consecutive Odd field lines. Modes 4, 5, and 6 are identical to Modes 1,2, and 3 respectively, expect that one pixel in each of the Odd or Even lines of the macroblock is addressed, instead of two. The one pixel addressing modes are not used in the DCT type calculation.

Figure 4:
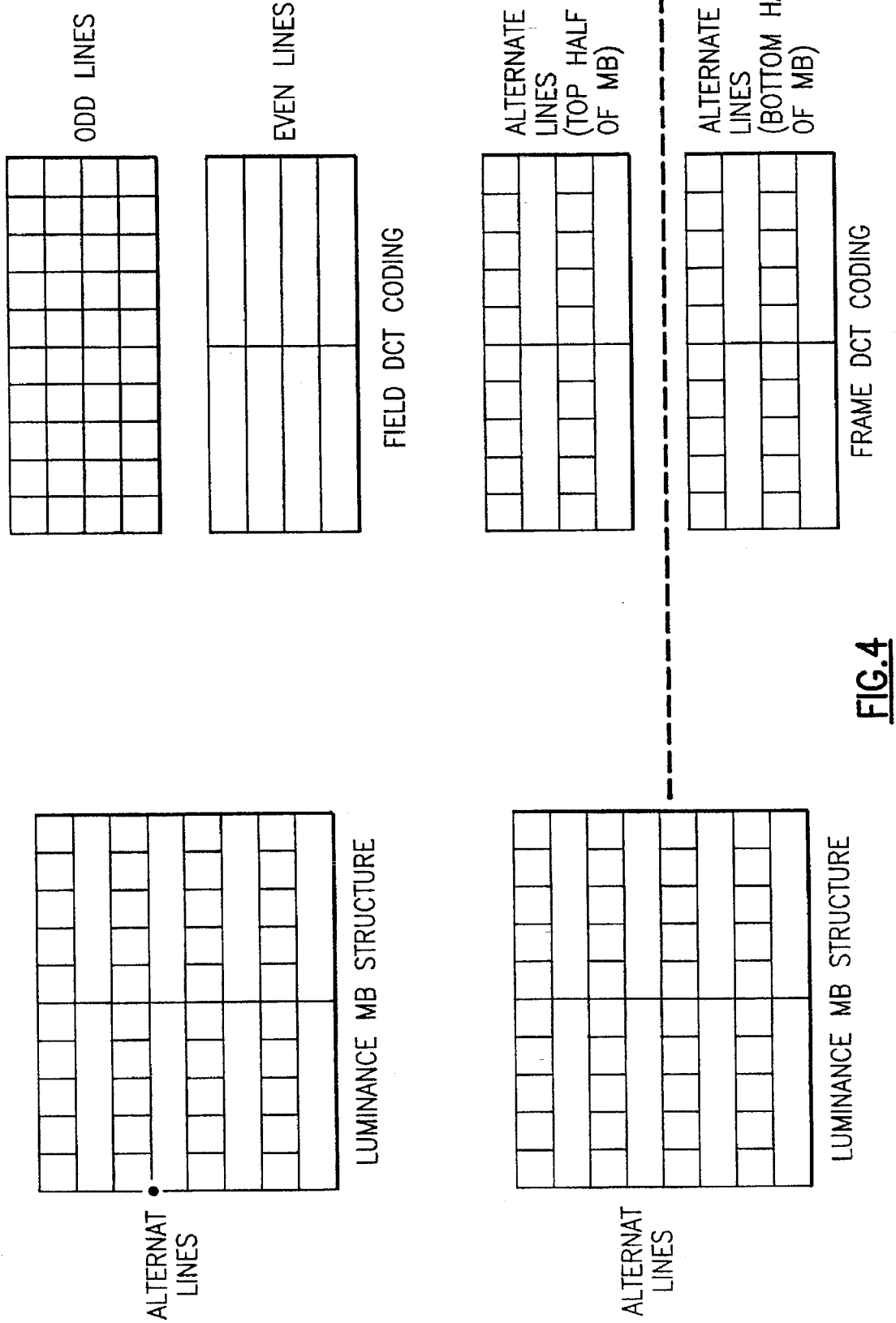
FIG. 4 shows the subtraction of pixels, e.g., between consecutive lines, between odd lines, and between even lines.

The DCT type calculation involves three different subtractions: subtraction between consecutive lines, subtraction between the odd lines and subtraction between the even lines as shown in FIG. 4.

The smallest variance of the above subtractions is used to determine the DCT coding type. This pixel variance calculation is computation intensive involving every pixel. There are 256 pixels every macroblock, requiring 128 subtractions and 128 additions for the frame DCT calculation, and another 128 subtractions and 128 additions for the field DCT calculation. In a final step, the totals of the four accumulated values are added using an accumulator sum instruction, ACCSUM. A compare instruction is needed to determine which variance is smaller frame DCT or field DCT. In processors used heretofore this decision will require 512 calculations. In the processor of the instant invention, the mode bit is used to specify 4 calculations to be carried out in one cycle. The number of cycles required to perform this calculation is improved by a factor of four, resulting in one hundred twenty eight cycles required to perform the calculation.

Only two instructions are needed to calculate the variances. The instructions are SUBABS and ADDACC. These two instructions form a subroutine and are looped until all pixels in the macroblock have been used. The loop is used once for the frame DCT calculation and once again for the field DCT calculation. The SUBABS instruction is used to calculate the absolute value of the difference between two pixels. The ADDACC instruction is used to accumulate the results of the SUBABS instruction.

By pipelining the result of the SUBABS into the input of the ADDACC, intermediate memory read or write instructions are not needed. In this mode of operation, the above instructions improve performance by reducing the cycles required per calculation.

The processor, 11, of the invention is utilized in a digital video encoder processor for discrete cosine transform encoding. The discrete cosine transform encoding includes the encoding steps of (1) determining the discrete cosine transform field or frame type, (2) addressing individual pixels as either (i) vertically adjacent pixels on consecutive Odd and Even field lines, or (ii) vertically adjacent pixels on consecutive Odd field lines, then consecutive Even field lines; or (iii) vertically adjacent pixels on consecutive Even field lines, then consecutive Odd field lines. These subtractions may be performed between (i) consecutive lines, (ii) odd lines, or (iii) even lines. The next step is finding the smallest variance of the above subtractions to determine the discrete cosine transform coding type. The subtractions are carried out in a dynamically partitionable processor having a plurality of datapaths, 33, 35, 37, 39. The datapaths 33, 35, 37, 39, are partitionable by the action of running opcode into (i) a single wide datapath, 31, and (ii) a plurality of narrow datapaths, 33, 35, 37, 39, for calculating the absolute value of the difference between two pixels, and accumulating the results of the subtraction.

Another compression technique following calculation of the DCT coefficients is quantization. Quantization is a process to determine the stepsize per macroblock. Stepsize is based on the light intensity variances of the macroblock. The average of intensity of the macroblock is first calculated. Variances of each block are then determined. The smallest variance is used to select the stepsize for the macroblock. In the processor described herein, the average intensity can be calculated by ADDACC and shift instructions. The ADDACC instruction forms a subroutine of one instruction and is looped until all of the pixels in the 8 by 8 block are used. The accumulated result is divided by 64 via a shift right instruction.

The LP mode option is used for performance improvement. The addition of all luminance pixels is performed by the four ALUs, 33, 35, 37, and 39, in parallel. The average of each group is then calculated by performing a SHIFT RIGHT on the result.

The variance intensity is calculated by the SUBABS and ADDACC instructions. The SUBABS is used to determine the difference of each pixel data from the average of the block. ADDACC is used to accumulate the differences in each block. The smallest accumulation among the four blocks is used to determine the stepsize of the macroblock. By choosing LP mode, the computation of the four blocks is carried out simultaneously.

The architecture of the instructions in the processor, 11, and the execution unit design allows the dynamic partition of a single four byte dataflow to operate as one four byte dataflow unit or as four one byte execution units. The dynamic partitionable capability enhances the processor output, thereby providing a system that increases the speed of the encoding process, especially the Discrete Cosine Transform encoding process, and reducing the clock cycles required for encoding a picture.

While the invention has been described with respect to certain preferred embodiments and exemplifications, it is not intended to limit the scope of the invention thereby, but solely by the claims appended hereto.

We claim:

1. A digital video encoder processor for discrete cosine transform encoding, including the encoding steps of (1) determining the discrete cosine transform field or frame type, (2) addressing individual pixels as
   (i) vertically adjacent pixels on consecutive Odd and Even field lines,
   (ii) vertically adjacent pixels on consecutive Odd field lines, then consecutive Even field lines; or
   (iii) vertically adjacent pixels on consecutive Even field lines, then consecutive Odd field lines;

(3) performing subtractions between
   (i) consecutive lines,
   (ii) odd lines, and
   (iii) even lines;

(4) finding the smallest variance of the subtractions in step (3) to determine the discrete cosine transform coding type;

(5) said subtractions in step (3) being carried out in a dynamically partitionable processor having a plurality of datapaths, said datapaths being partitionable by the action of running opcode thereon into (i) a single wide datapath, and (ii) a plurality of narrow datapaths for calculating the absolute value of the difference between two pixels, and accumulating the results of the subtraction.

2. The digital video encoder processor of claim 1 having n individual datapaths, said datapaths being partitionable by the action of running opcode thereon into (1) a single n byte wide datapath, and (2) n individual one byte datapaths.

3. The digital video encoder processor of claim 2 wherein n is 4, said processor having four individual datapaths, said datapaths being partitionable by the action of running opcode thereon into (1) a single four byte wide datapath, and (2) four individual one byte datapaths.

4. A dynamically partitionable processor having a plurality of datapaths, said datapaths being partitionable by the action of running opcode thereon into (1) a single wide datapath, and (2) a plurality of narrow datapaths.

5. The dynamically partitionable processor of claim 4 having n individual datapaths, said datapaths being partitionable by the action of running opcode thereon into (1) a single n byte wide datapath, and (2) n individual one byte datapaths.

6. The dynamically partitionable processor of claim 5 wherein n is 4, said processor having four individual datapaths, said datapaths being partitionable by the action of running opcode thereon into (1) a single four byte wide datapath, and (2) four individual one byte datapaths.

7. The dynamically partitionable processor of claim 5 wherein the average intensity of a 8 by 8 block is calculated by adding the accumulator contents and shifting right.

* * * * *